Jan. 15, 1963  R. L. FISCHER  3,073,547
PROPELLER CONTROL SYSTEM

Filed May 4, 1961  5 Sheets-Sheet 1

INVENTOR
RICHARD L. FISCHER
BY Harris G. Luther
ATTORNEY

Jan. 15, 1963 R. L. FISCHER 3,073,547
PROPELLER CONTROL SYSTEM
Filed May 4, 1961 5 Sheets-Sheet 2
FIG_3
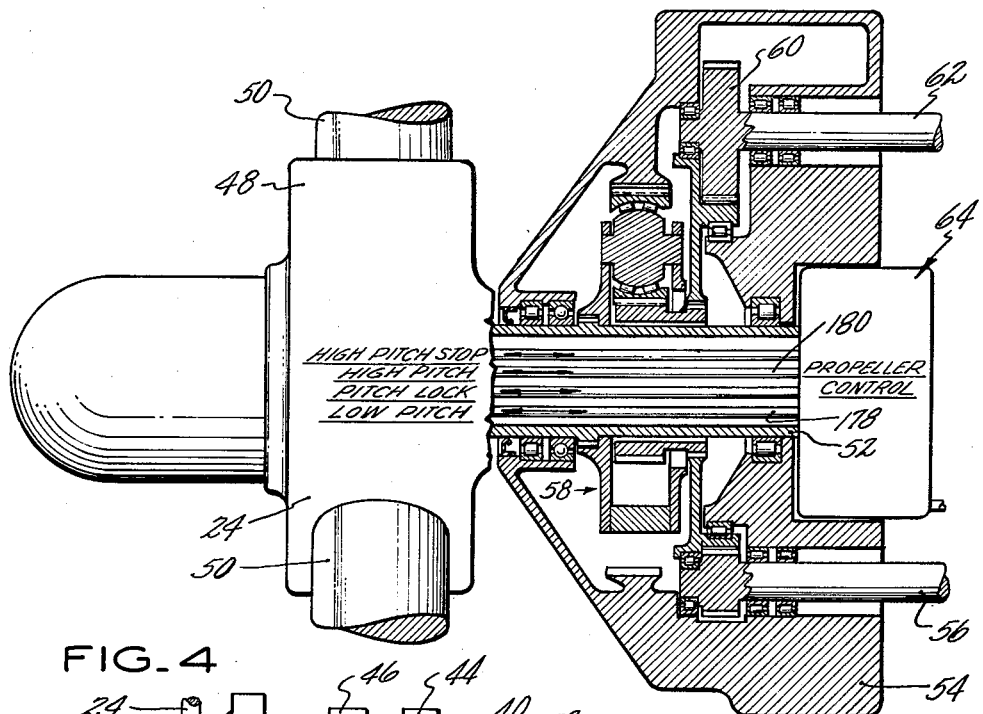
FIG_4
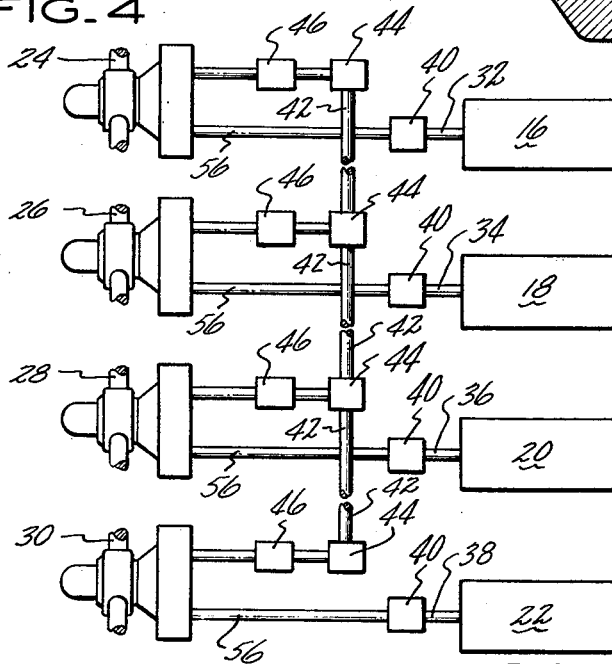
INVENTOR
RICHARD L. FISCHER
BY Harris G. Luther
ATTORNEY

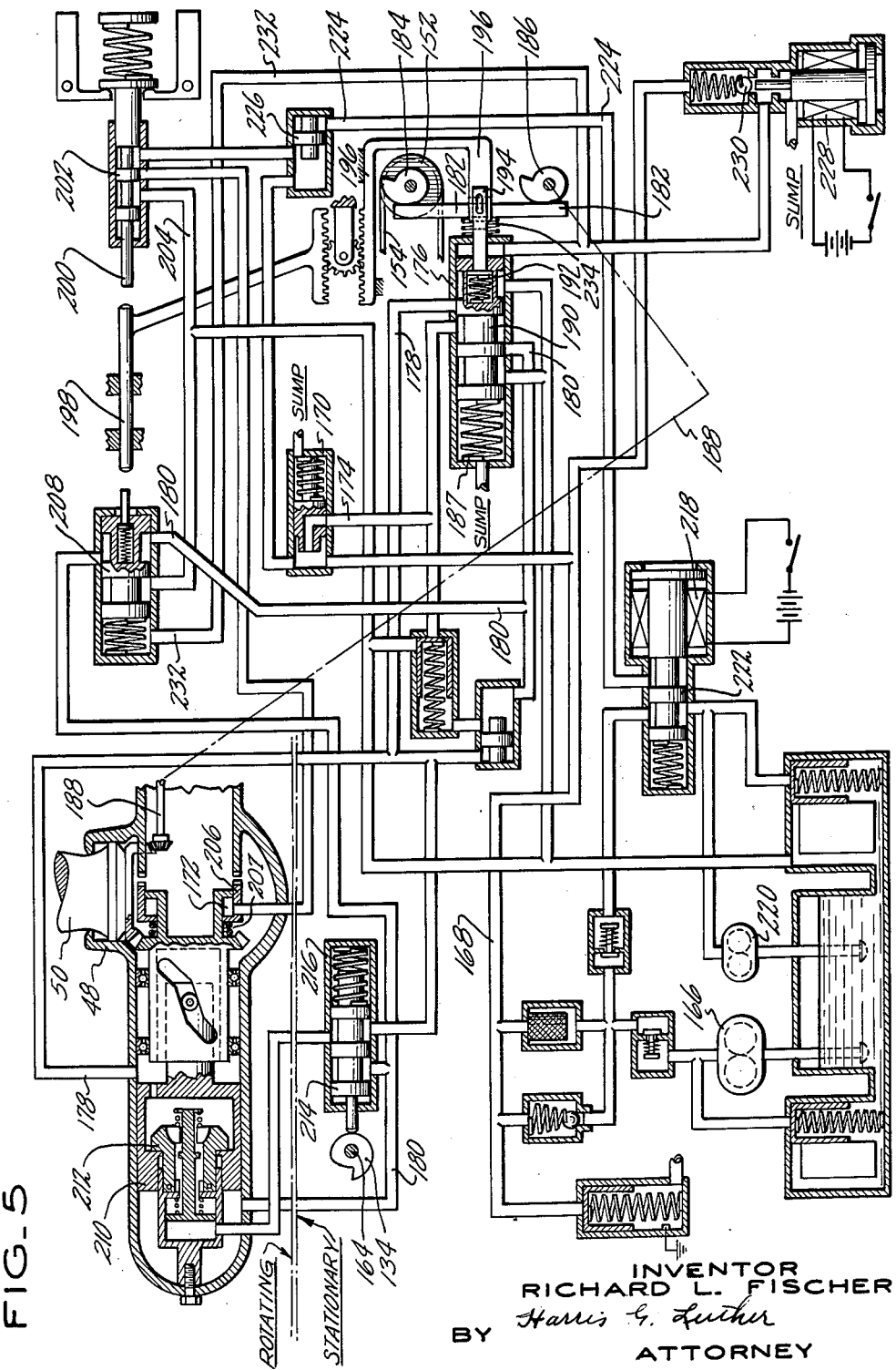

Jan. 15, 1963

R. L. FISCHER 3,073,547

PROPELLER CONTROL SYSTEM

Filed May 4, 1961

INVENTOR
RICHARD L. FISCHER
BY Harris G. Luther
ATTORNEY

Jan. 15, 1963 R. L. FISCHER 3,073,547
PROPELLER CONTROL SYSTEM
Filed May 4, 1961 5 Sheets-Sheet 5

INVENTOR
RICHARD L. FISCHER
BY *Harris G. Luther*
ATTORNEY

United States Patent Office 3,073,547
Patented Jan. 15, 1963

3,073,547
PROPELLER CONTROL SYSTEM
Richard L. Fischer, Suffield, Conn., assignor to United Aircraft Corporation, East Hartford, Conn., a corporation of Delaware
Filed May 4, 1961, Ser. No. 107,763
27 Claims. (Cl. 244—7)

This invention relates to propeller control mechanism and particularly to such control mechanism for vertical take-off and landing aircraft.

An object of this invention is a control system, having selectively operable controls, and including a single interconnecting propeller control for a plurality of propellers.

Another object of this invention is pitch limit stops positioned in accordance with the tiltable wing position or equivalent.

A still further object is roll control by differential pitch control in a cross-shafted multiple propeller installation.

A still further object is a control with mechanism for limiting the variation in propeller pitch in either direction from a selected pitch.

Other objects and advantages will be apparent from the following specification and the accompanying drawings in which—

FIGURE 3 is a schematic view of the propeller, its drive, and the controls.

FIGURE 4 is a schematic view of the propeller drives and cross shafting.

FIGURE 5 is a schematic view of the individual propeller controls.

FIGURE 6 is a schematic view of the master control.

Figure 1:
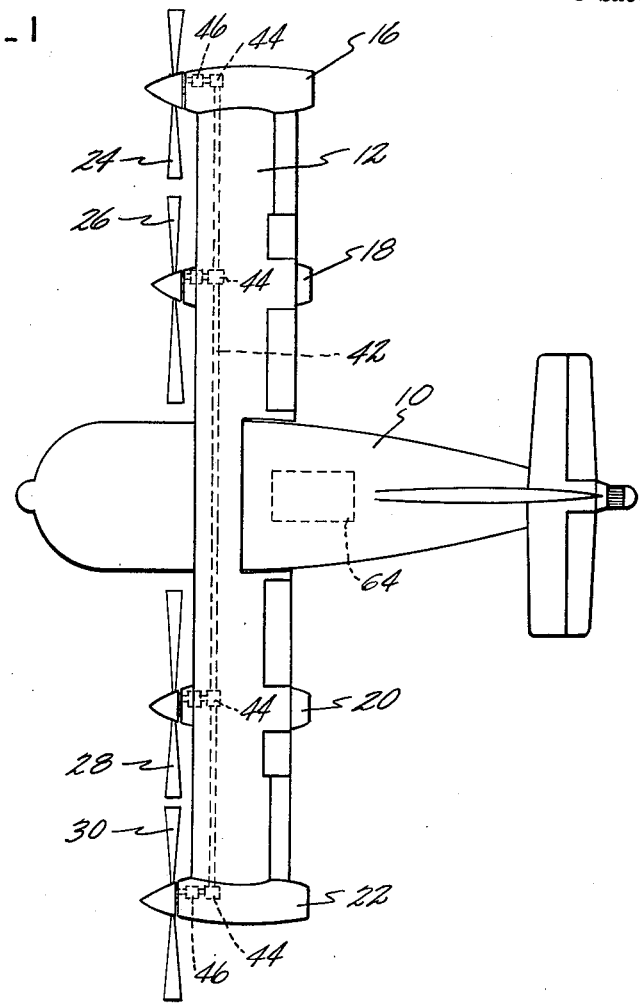
FIGURE 1 is a plan view of a VTOL aircraft showing the cross shafting.

The propeller control system incorporating the present invention is disclosed in connection with, and finds particular utility in, an aircraft of the vertical take-off and landing type, generally referred to as a VTOL aircraft. Such an aircraft may comprise a fuselage or cabin housing the pilot and passengers, and the master control for the propellers. A wing, or equivalent structure, supporting the propellers, the engines for driving the propellers, and the individual propeller control systems, extends transversely of the fuselage and is pivoted to the fuselage so as to provide for movement of the wing or equivalent structure relative of the fuselage about a horizontal axis between a position in which cord of the wing or the propeller axis extends substantially parallel to the longitudinal axis of the fuselage and a position in which the wing cord or propeller axis extends substantially normal to the fuselage longitudinal axis.

In the embodiment chosen to illustrate the invention, there are four propellers, two on either side of the fuselage, each propeller driven by a seperate engine. Different arrangements could, of course, be used, such as two propellers driven by a single engine or one propeller driven by two engines. The propellers are all interconnected by gears and cross shafting, so that all of the propellers will always rotate, even if one of the engines should fail. A clutch, usually of the automatic overrunning type, connects each engine with its propeller to permit rotation of the propeller without rotation of the engine and a second clutch usually of the manually controlled type connects each propeller with the cross shafting, so that, if desired, one or more of the propellers may be disconnected from the shafting and feathered in normal horizontal flight, and that propeller stopped from rotating while the remainder of the propellers continue to rotate.

Each of the propellers has its own individual pitch control and the two propellers on either side of the fuselage form a sub-system in which the two propellers on one side are simultaneously controlled to give the two propellers of the sub-system the same pitch. A master control, including speed responsive mechanism, is provided to simultaneously and equally control the pitch of all four propellers to maintain a selected propeller speed. A differential control is associated with the master control, in parallel with the speed control, by means of which the propellers of one sub-system may be increased in pitch while the propellers of the other sub-system may be decreased in pitch to effect roll control while the aircraft is hovering or is in vertical flight.

Pitch and yaw control during vertical flight may be obtained by any of the well known means, not shown and not forming a part of this invention, such as additional propellers or jet exhausts located in the tail of the fuselage. The master control and the differential control are located in the fuselage and these controls are operably connected, preferably through the pivotal connection between the wing or equivalent structure and the fuselage, to the individual propeller controls in the wing. Any suitable mechanism such as a worm and gear, not forming a part of this invention, may be utilized for turning the wing or propeller supports with respect to the fuselage on an axis extending generally span-wise of the wing to move the wing between positions in which the cord of the wing or the propeller axis is generally horizontal with the propellers rotating in a substantially vertical plane, and a position in which the cord of the wing or propeller axis is generally vertical with the propellers rotating in a generally horizontal plane.

In VTOL aircraft during vertical flight it is necessary to keep all the propellers rotating and producing lift in order to maintain flight, so provision must be made to keep all the propellers functioning even if there should be failure of an engine, or malfunctioning of the master control, or of the individual control of one of the propellers. In order to prevent stalling of the propeller blades it is necessary to limit the high pitch attainable in vertical flight but remove or change such a limit in forward flight. The present invention provides such safeguards.

Incorporated in the control system are two selectively operable speedmaster controls continuously connected with the propeller control system, a positive mechanical fixed low pitch stop, and a mechanical high pitch stop acting on the master control system and adjustable in accordance with the wing position relative to the fuselage. Other protective devices are incorporated in the individual propeller pitch controls and comprise an overspeed pitch lock with means for actuating the pitch lock to lock the pitch against decreasing if the propeller pitch reduces more than a predetermined number of degrees below the pitch called for by the master control. An increase pitch limit is also provided to limit any increase in pitch to a predetermined number of degrees greater than the pitch called for by the master control. Hence under any malfunctioning of the individual propeller control system, the pitch of the individual propeller is limited in range above or below that called for by the master control. Hence, upon malfunctioning of the individual control, pitch change is limited to a predetermined number of degrees from the selected pitch and the loss or gain in thrust may be compensated through the roll control which will change the pitch and thrust of the other propeller of the sub-system to compensate for the change in thrust and will change the pitch and thrust of the other sub-system to compensate for any change in roll movement. A removable positive mechanical high pitch stop is provided to limit the high pitch attainable while the aircraft is in vertical or hovering flight to a pitch which will provide vertical flight in the event of malfunctioning of the master control stop, and means responsive to the wing position is provided for disabling this positive high pitch stop when the wing and propellers are turned to a position for forward flight.

Figure 2:
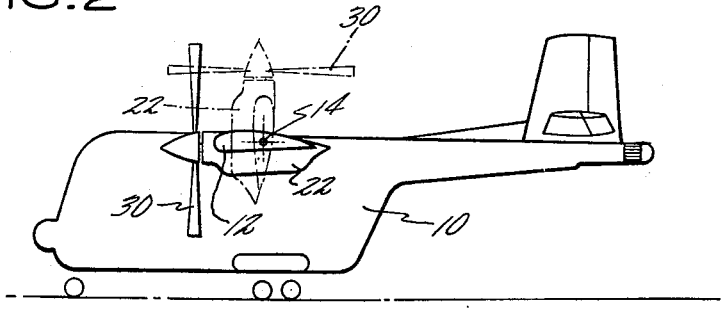
FIGURE 2 is a side view showing the horizontal and the vertical position of the tiltable wing.
Figure 7:
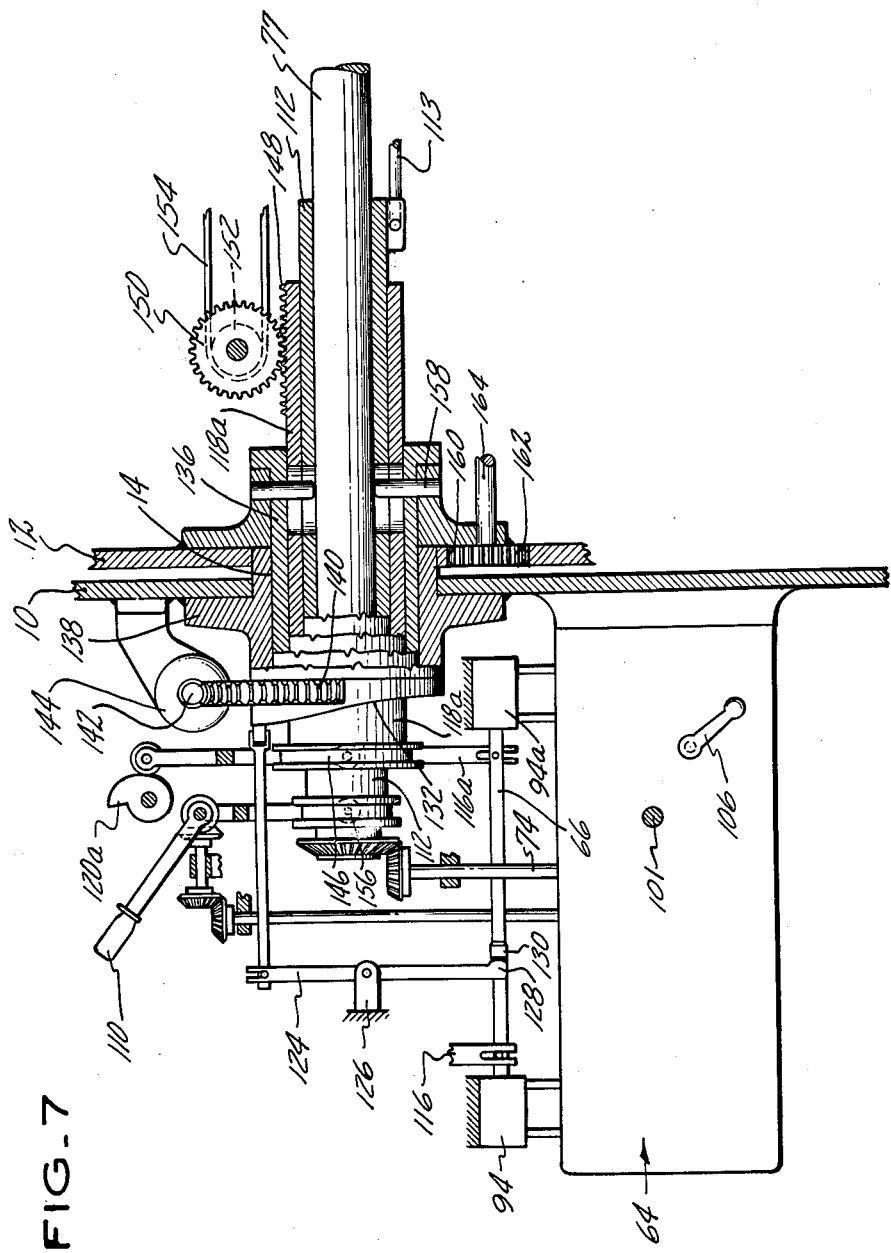
FIGURE 7 is a schematic view of the connections between the master control and the individual propeller controls.

Coming now to the detailed description and operation, the aircraft comprises a fuselage 10 supporting a wing 12 on pivots 14 for movement between horizontal and vertical position as shown in FIG. 2. Mounted on the wing are four engines, 16, 18, 20, and 22, two on either side of the fuselage 10. The engines drive individual propellers 24, 26, 28, and 30, by means of shafts 32, 34, 36, and 38 respectively, FIG. 4. A clutch 40 preferably of the overrunning type is provided between each engine and its propeller. A cross shaft 42 is geared to each propeller through gear boxes 44 so as to provide simultaneous and equal rotation of all the propellers at a fixed speed ratio, a clutch 46 preferably of the manually actuated type, is provided between each gear box 44 and the respective propeller. Disengagement of the clutch 46 will disengage the associated propeller from the remainder of the group of propellers. The disengaged propeller may then be run independently or the disengaged propeller may be feathered and stopped upon failure or shutting down of its respective engine. The four propellers are identical and taking propeller 24 for example, each has a hub 48 supporting blades 50 for pitch changing movement in the hub. The hub 48, FIG. 3, is supported on a propeller shaft 52 which in turn is supported for rotation in a housing 54 carried by the wing 12. A shaft 56 connects the clutch 40 with the propeller and by means of a reduction gear indicated generally at 58 drives the propeller shaft 52 and the propeller. The propeller reduction gear is connected by means of a gear 60 and a shaft 62 with the clutch 46 and the cross shaft 42. Individual hydraulic propeller control mechanism is indicated generally at 64, and is connected through transfer joints, not shown but well known in the art, to hydraulic pitch changing mechanism including pitch lock mechanism and pitch stop mechanism, all well known in the art. As propellers of this type are well known, it is believed unnecessary to provide any further description in order to understand the present invention, but reference may be made to Patents 2,477,868 to Forman, issued on August 2, 1949; 2,653,668 to Anderson, issued on September 29, 1953; 2,704,583 to Jedrziewski, issued on March 22, 1955; and 2,850,103 to Pearl, issued on September 2, 1958, for further details. The master control may be located in the wing along with the several individual controls and the several manual controls for the master control may be brought out through linkages or connections, to a position convenient to the pilot or preferably as shown in this application, the master control may be in the fuselage with its controls convenient to the pilot and the several connections between the master control and the individual controls, such as the individual pitch control, the engine throttle control, and the governor drive, may be transmitted through a slip joint in the pivotal connection between the fuselage and the wing, as shown in FIG. 7.

Taking up the master control, FIG. 6, first, a main and a substantially identical stand-by section are provided, which are tied together by linkage 66 and a master control or selector valve indicated generally at 68. Only one of these sections will be described in detail, but similar numbers will be used to indicate the similar parts the numbers in the stand-by section being followed by the letter "a." A governor schematically shown and indicated generally at 70, FIG. 6, and a pump 72 are driven by a shaft 74, FIG. 7, which is driven by a shaft 77 which may be the cross shaft 42 or a shaft driven therefrom, so as to be continuously rotated when any of the propellers are rotating. Pump 72 supplies high pressure oil from the sump or reservoir 75 through line 76 to the governor 70 and through line 78 to the selector valve 68. A drain line 80 connects the governor with a sump or drain, so that actuation of the valve 82 by the fly weights 84 will serve to hydraulically position sleeve 86, which in turn will connect line 88 with either pressure in line 76 or the drain in line 80. Line 88 connects the governor with the master control valve 68. In the position of the control valve 68 shown in FIG. 6, oil is continuously supplied under pressure through line 90 to the chamber 92 of the servo motor 94, and governor controlled oil from line 88 is supplied through the line 96 to the chamber 98. Because of the differential area of the servo motor operating member or piston 100, the same pressure applied on both sides of the piston 100 will cause it to move to the right, and drainage of pressure from the chamber 98 will cause the piston 100 to move to the left. The range of movement of piston 100 is limited by physical characteristics such as contact of the piston with the ends of the servo chambers. In the position of the master control valve 68 shown in FIG. 6, drain line 80 is blocked by the valve member 102, but line 80a is connected through passage 104a in the valve 102 with the line 96a and is also connected with the line 90a so that both sides of the servo motor piston 100a are connected with drain. Hence although governor 70a continuously operates and selectively connects line 88a with pressure or drain in the same manner as governor 70 connects line 88 with pressure or drain, the valve 102 prevents the servo motor 100a from responding. Actuation of the valve 102, by means of the manual control knob 101, to the right from the position shown in FIG. 6 will connect line 88a with line 96a and line 90a with line 78a so as to continuously supply pressure to the chamber 92a and place the chamber 98a under the control of governor 70a. At the same time line 90 will be disconnected from the line 78 and lines 90 and 96 will both be connected with the drain line 80 to thus transfer control from the governor 70 and the servo motor 94 to the governor 70a and the servo motor 94a. The speed settings of governor 70 and 70a are simultaneously set by a speed control lever 106 which is operatively connected with speeder spring setting cams 108 and 108a and determines the speed of the several propellers. A throttle or power lever 110 is operatively connected by a connection 112 with the throttles or power control devices of all of the engines. The power control lever 110 is also operatively connected with anticipator cams 114 and 114a to temporarily bias the sleeve 86 and 86a of the governors to change the propeller pitch in anticipation of an increase in power or a decrease in power.

A pair of levers 116 and 116a are each connected by a pin and slot connection to the rod or link 66 connecting servo motor 94 with servo motor 94a. Control rods 118 and 118a are pivotly connected intermediate the ends of the levers 116 and 116a respectively and simultaneously control the pitch of all the propellers, rod 118 controlling the pitch of the propellers on one side of the fuselage and the rod 118a controlling the pitch of the propellers on the other side of the fuselage to change the propeller pitch through a range corresponding to the range of movement of the servo motors 94, 94a. The ends of the levers 116 and 116a remote from the rod 66 are forced against cams 120 and 120a respectively by any suitable means which could be springs, not shown, acting on the control rods 118 and 118a. Cams 120 and 120a are connected together for simultaneous actuation by a roll control lever 122 which will serve to move control rods 118 and 118a in opposite directions to increase the pitch of the propellers on one side of the fuselage while simultaneously decreasing the pitch of the propellers on the other side of the fuselage. With the propellers arranged to rotate in a horizontal plane, actuation of the control lever 122 will increase the lift on one side of the fuselage and decrease the lift on the other side of the fuselage to effect a roll control.

The stop lever 124 is pivotally supported intermediate its ends on a support 126 which is the same support to which the servo motors 94 and 94a are secured. The end 128 of lever 124 is positioned to contact an abutment 130 carried by the rod 66 interconnecting the servo motors 94 and 94a. The other end of the rod 124 is positioned by a cam 132 which in turn is operatively connected with the wing so that movement of the wing between the horizontal and the vertical position will turn the cam 132 and position the end 128 of the lever 124. Further movement of rod 66 in a pitch increasing direction is prevented and the range of movement of the motors 94, 94a is limited when abutment 130 contacts rod end 128, so that the position of cam 132 will determine the high pitch limit of the propellers at least as far as the master control is concerned. This high pitch limit is increased and the range of movement of the motor 94, 94a is increased as the wing is moved from a vertical to a horizontal position, so that the size of the range of movement and the pitch range of the blades may be increased and the blades may be placed in a higher pitch position for forward flight than in vertical flight or hovering.

Any suitable means may be provided for transferring the motions of the pitch and throttle controls from the master control to the several separate propellers carried by the wing or equivalent support, and any suitable mechanism may be provided for indicating the relative position of the fuselage and wing or support for operating the cam 132 of the master control, and cams 134 in the individual propellers, one of which is shown in FIG. 5. One example of a portion of such a mechanism is shown in FIG. 7, in which a shaft or stud 136 is secured to the wing 12 on one side of the fuselage and projects through and is supported by a bearing 138 carried by the fuselage 10 and provides the hinge joint 14 by which the wing is supported on the fuselage and about which the wing may turn. A worm wheel 140 is mounted on the inboard end of shaft 136 and meshes with a worm 142 driven by a motor 144 supported in the fuselage 10 to turn the wing 12 relative to the fuselage and about its pivot. Cam 132 may be carried by worm gear 140 or a cam 132 acting directly on the lever 128 may be driven by shafting gear driven from shaft 136. Sleeve 118a is mounted for longitudinal movement inside shaft 136 and carries a slip joint 146 at one end connecting with lever 116a and has a rack 148 meshing with a gear 150 at its other end. Gear 150 drives pulley 152 operating cables 154 connected with the individual pitch changing mechanism described hereinafter. There may be as many pulley and cable combinations driven by the gear 150 as there are individual propellers to be controlled by the individual arm 118a. The throttle control may comprise a second sleeve 112 telescoped inside of the sleeve 118a and carrying a slip joint 156 at one end connecting with the throttle lever 110 and carrying a rod 113 at its other end connecting with the engine control mechanism. There may be as many rods 113 as there are engines to be controlled. A pin 158 secured to the wing 12 and operating in slots in the sleeves 118a and 112 permits longitudinal movements of the sleeves but prevents relative rotation of the wing and sleeves. A gear 160 carried by the bearing member 138 and the fuselage 10 meshes with the gear 162, carried by the wing 12, to drive a shaft 164 to in turn drive a wing positioned cam 134, FIG. 5, which purpose will be described hereinafter.

It will be understood that there is a similar connection to that shown in FIG. 7 on the opposite side of the fuselage to provide the controls for the propellers on that side. After the controls have been brought from the fuselage into the wing, they are led to the several individual propellers to simultaneously control these propellers. The controls for the several propellers are identical and although only one propeller is shown in FIG. 5 it will be understood that the same controls are used on each of the other propellers.

Pump 166 which may be driven from engine shaft 56 supplies fluid under pressure to line 168 and pressurizing valve 170 which assures that pressure will be supplied to unlock the pitch lock 172 before it is supplied to the control mechanism. Pressure is then led through the line 174 to the distributor valve 176. The distributor valve can selectively supply pressure to the low pitch line 178 and connect the high pitch line 180 with drain or supply pressure to the high pitch line 180 and connect the low pitch line 178 with drain. The application of pressure in the lines 178 and 180 will change the propeller pitch in a manner well known in the art. A typical hydraulically actuated propeller is shown in FIG. 5 schematically, but for further details references may be made to Patent Nos. 2,653,668 and 2,850,103. The distributor valve 176 is positioned by means of crossbar 182 pivotally connected between its ends to the movable member of valve 176 and having one end positioned by a cam 184 controlled by cables 154 from the master control and having its other end positioned by a cam 186 controlled by the pitch position of the blade 50 through a well known feedback mechanism 188. As one end of the lever 182 is positioned by the master control cam 184 to select a propeller blade pitch by moving the distributor valve 176, the other end of the lever 182 is moved in the opposite direction as the pitch is changed, so that when the selected pitch is reached the distributor valve 176 will be returned to a neutral position. This mechanism connecting the control device including servos 94, 94a with the propeller blades and pitch changing mechanism will provide a pitch position corresponding to the control position and maintain a substantially fixed predetermined ratio of control movement to pitch change movement for each control position. Crossbar 182 is continuously urged against cams 184 and 186 by a spring 187 acting through valve 190, spring 192, and rod 194, pivotally connected to the arm 182. Provision is also made for movement of the arm 182 to the left in the event the plunger 190 becomes stuck by moving the rod 194 in the plunger 190 and compressing the spring 192. Provision is also made for moving the crossbar 182 to the right by spring 234 in the event the plunger 190 becomes stuck. A bar 196 connected with the central portion of the crossarm 182, to be moved thereby, is operatively connected with a plunger 198 to position the plunger 198 in accordance with the position of the central portion of the cross member 182. The position of the central portion of the cross-member 182 is an indication of any difference between the propeller pitch called for by the cam 184 and the actual pitch of the propeller as indicated by the cam 186. If this difference between the selected pitch and the actual pitch exceeds some selected amount, say 2 degrees, provision is made to prevent any further change of the propeller pitch to increase that difference. If the pitch is 2 degrees or more below that called for by the pitch selector, the rod 198 will move to the right and contact an extension 200 of the centrifugally controlled pivot valve 202 of the pitch lock mechanism and connect the pitch lock chamber 172 with the drain line 204, so as to drain pressure fluid from the chamber 172 in a well known manner and permit pitch lock 206 to move to the right under the influence of a spring 207 to engage with the mating portion of the hub 48 and prevent further pitch reduction. In the event that the propeller pitch is 2 degrees or more higher than that called for by the pitch selector, rod 198 will move to the left, and move plunger 208 of the increase pitch limit valve to the left to block any further flow of pressure fluid through the line 180 to the high pitch side of the pitch changing motor 210 and connect that high pitch side with the drain line 204 to thus effectively stop any further increase in pitch, although a stuck distributor valve may still be calling for such increase.

The pitch changing motor 210 is provided with a well known mechanical high pitch stop mechanism 212 which is normally spring pressed into active position and may be hydraulically disabled or moved into inactive position. A valve 214 positioned by cam 134 and spring 216 normally connects the hydraulic disabling mechanism with the low pitch side of the pitch changing motor so that whenever pressure is applied to the high pitch side of the pitch changing motor and the low pitch side connected with drain the high pitch stop is always in active position. Movement of the wing relative to the fuselage from a vertical to a horizontal position will activate cam 134 and move plunger 214 to the right to connect the hydraulic stop disabling mechanism with the high pitch side of the pitch changing motor so that when high pitch pressure is applied to the motor to increase the pitch, the stop will be disabled, this permitting the pitch changing motor to increase the pitch beyond that normally limited by the high pitch stop. The high pitch stop 212 is a safety device and acts to limit the high pitch which may be obtained by the propeller blades in vertical flight in the event of a malfunction of the linkage between the master control and the propeller control.

A solenoid 218 which may be energized simultaneously with a motor operating an auxiliary pump 220 will move a valve 222 to the left to connect the output of the auxiliary pump with the line 224 connected with the pitch lock control valve 202 through the shuttle valve 226 and thus supply pressure to the chamber 172 of the pitch lock mechanism to release the pitch lock 206 in the event a manual release of the lock is either necessary or desirable.

A solenoid 228 may be actuated to unseat valve 230, bypass the limit imposed by stop means 128, 130 and supply high pressure to the right hand end of the distributor valve 190 and move that valve so as to call for high pitch whenever it is desired to feather the propeller. A branch line 232 supplies pressure to the left hand side of the plunger 208 to prevent actuation of the high pitch stop mechanism during the feathering operation.

It is to be understood that the invention is not limited to the specific embodiment herein illustrated and described, but may be used in other ways without departure from its spirit, and that various changes can be made which would come within the scope of the invention which is limited only by the appended claims.

I claim:

1. In combination with a plurality of controllable pitch propellers interconnected for rotation at a fixed speed ratio, each having pitch changing mechanism, means interconnecting said pitch changing mechanisms for simultaneous and equal pitch changing movement of all said propellers, a master control comprising a first speed responsive governor driven in timed relation to all said propellers, a motor having a connection with and controlled by said governor and operatively connected with said interconnecting means, a second speed responsive governor driven in timed relation to all said propellers at the same speed as said first governor, a second motor having a connection with and controlled by said second governor and operatively connected with said interconnecting means, selector mechanism in the connection between each governor and its respective motor, and means for actuating said selector mechanism to selectively disable one motor and activate the other motor to control the pitch of all said propellers.

2. A combination as claimed in claim 1 in which each motor is a hydraulic servo motor, and the connection between each motor and its respective governor comprises a line selectively connected by said governor with hydraulic pressure, and drain conduits, and the selector mechanism includes means selectively operatively connecting one motor with its governor controlled line and operatively connecting the other motor with drain and blocking the governor controlled line to said other motor.

3. A combination as claimed in claim 1 in which each motor is a differential hydraulic servo motor and the connection between each motor and its respective governor comprises a line selectively connected by said governor with hydraulic pressure and drain conduits for selectively supplying the larger area side of the servo motor with either pressure or drain and the selector mechanism includes means selectively operatively connecting the larger side of one motor with its governor controlled pressure and drain lines and the smaller side of said one motor with a source of pressure, and operatively connecting both sides of the other motor with a drain connection.

4. In combination with a controllable pitch propeller having pitch changing mechanism, a master control comprising a speed responsive governor driven in timed relation to said propeller, a first motor having a connection with, and controlled by, said governor and operatively connected with said pitch changing mechanism, a second speed responsive governor driven in timed relation to said propeller, a second motor having a connection with, and controlled by, said second governor and operatively connected with said pitch changing mechanism and said first motor, selector mechanism in the connection between each governor and its respective motor, and means for actuating said selector mechanism to selectively activate one of said motors.

5. In a pitch control system for a propeller, a pitch control member, a main pitch control servo, a stand-by pitch control servo, means operatively interconnecting said main and stand-by control servos and said pitch control member for synchronous and equal pitch control movements, continuously operating speed responsive governor means including valve means for supplying fluid to said servos and means including selector mechanism operatively connecting said governor means with said servos for selectively directing servo fluid to either the main servo or to the stand-by servo.

6. In a hydraulically actuated pitch control system for a propeller, a pitch control device comprising a main hydraulic servo motor, a stand-by hydraulic servo motor, each servo motor having two pressure fluid receiving chambers separated by an operating member, means holding said motors against unequal movement and operatively connecting said motors to a common pitch control member, means for continuously supplying hydraulic fluid under pressure for said motors, a unitary manually actuatable valve means controlling flow to both motors for diverting flow of said fluid supply to said stand-by motor chambers under selected conditions and connecting both chambers of said main servo motor with drain.

7. In a propeller pitch control system, a main control comprising a main hydraulic motor, a continuously operating speed responsive main governor including valve means for supplying hydraulic fluid for said motor, speed setting means for said main governor, a stand-by hydraulic motor, a continuously operating speed responsive stand-by governor including valve means for supplying hydraulic fluid for said stand-by motor, speed setting means for said stand-by governor, means operatively connecting said motors to a common pitch control member for synchronous movement, means operatively connecting said speed setting means for said main and stand-by governors for synchronous speed setting movement, and means for selectively directing hydraulic fluid at will either to the main motor or to the stand-by motor.

8. In a aircraft having a movable propeller support, a controllable pitch propeller, control mechanism, means connecting said control mechanism and said propeller and having a position corresponding to the pitch of the propeller, stop means limiting the movement of said connecting means, and means positioned by the position of said movable propeller support adjusting the active position of said stop means without affecting the corresponding relative positions of the propeller pitch and the control mechanism.

9. In an aircraft having a compartment and a propeller support, means moving said support with respect to said compartment to provide vertical and horizontal flight, movable control means, a controllable pitch propeller having means, operatively connected with said control means, adjusting the propeller pitch to correspond with a selected position of said control means, stop mechanism limiting the movement of said control means, and means, controlled by the relative position of said compartment and support, adjusting said stop mechanism to provide different pitch limits in vertical and horizontal flight positions of the support while maintaining said corresponding relative positions of said pitch and said control means.

10. Control means as claimed in claim 9 including a plurality of controllable pitch propellers and common control means for all of the propellers, said stop mechanism limiting the movement of said control means toward high pitch during vertical flight to a smaller value than during forward flight.

11. Control means as claimed in claim 10 in which each propeller adjusting means includes a pitch changing motor and a high pitch stop limiting the high pitch movement of the respective propeller to a preselected value larger than said smaller value, and means controlled by the relative position of said support and compartment simultaneously disabling all of said high pitch stops as the support moves from a position for vertical flight to a position for horizontal flight.

12. Control means as claimed in claim 9 in which the stop mechanism limits the movement of the control means toward high pitch and the propeller pitch adjusting means includes a pitch changing motor and a high pitch stop limiting the high pitch movement of said motor to a preselected high pitch value and means, controlled by the relative position of said support and compartment, disabling said high pitch stop.

13. Control means as claimed in claim 12 in which said stop mechanism limits the propeller pitch to a lower value than said high pitch stop when the support is adjusted for vertical flight and limits the propeller pitch to a higher value than said preselected high pitch value when the support is adjusted for horizontal flight.

14. In an aircraft having a compartment and a propeller support movable with respect to said compartment in converting between horizontal and vertical flight, means for moving said support a controllable pitch propeller carried by said support and having a pitch changing motor and a high pitch stop limiting the high pitch movement of said motor, means, controlled by the relative position of said support and compartment, disabling said stop in horizontal flight position of said support.

15. Control means comprising in combination two engine-driven controllable pitch propellers, means driving said propellers at a fixed speed ratio, pitch varying mechanism for each propeller, means, including linkage, interconnecting the pitch varying mechanism of said propellers, a speed responsive governor driven in timed relation with both said propellers, a servo device connected with said linkage and interconnecting said pitch varying mechanisms and said governor, and a unitary manual control means simultaneously varying, in opposite directions, the linkage connection between said servo device and each of said pitch varying mechanisms to simultaneously increase the pitch of one propeller and decrease the pitch of the other propeller independent of said servo device while driving both propellers at said fixed speed ratio.

16. In an aircraft having at least four interconnected controllable pitch propellers arranged in two groups, one group on either side of the longitudinal axis of the airplane, a speed responsive governor operatively connected with said propellers to simultaneously and equally change the pitch of all of said propellers, pitch limiting means limiting the extent of pitch change in one direction of each propeller upon a malfunction of the control of that propeller, and control means, in the operative connection between said governor and said propellers, changing the pitch of the remainder of the propeller group having the malfunctioning propeller control in a direction opposite to the pitch change due to the malfunction and simultaneously changing the pitch of all the propellers of the other group in the same direction as the pitch change due to the malfunction to equalize the effective thrust of the two propeller groups while maintaining the speed control.

17. In combination with a controllable pitch propeller having pitch changing mechanism and normally inactive pitch limiting means, pitch control mechanism including control means having a null position in which no pitch change is effected, pitch selecting means operative to move said control means from the null position and effect a pitch change, feed back means responsive to the blade pitch position restoring said control means to the null position when the selected pitch has been reached, and means, actuated by said control means when the actual pitch departs from the selected pitch by a predetermined amount, activating said pitch limiting means.

18. A combination as claimed in claim 17 in which the normally inactive pitch limiting means comprises an overspeed responsive pitch lock effective on overspeed of the propeller to lock the pitch against a pitch reduction, and the means, actuated by the said control means, activating said pitch limiting means includes means biasing said overspeed responsive means and activating said pitch lock.

19. A combination as claimed in claim 17 in which the pitch changing mechanism includes a motor for moving said propeller toward high pitch and the normally inactive pitch limiting means is a device connected with said motor for disabling said motor, and the means, actuated by said control means, activating said pitch limiting means includes means activating said disabling means.

20. In combination with a controllable pitch propeller having hydraulic pitch changing mechanism including a conduit leading hydraulic fluid under pressure to said mechanism to increase the propeller pitch, a normally inactive pitch limiting device including a valve in said conduit and biased to open position, pitch control mechanism including control means having a null position in which no pitch change is effected, pitch selecting means operative to move said control means from the null position and effect a pitch change, feed back means responsive to the propeller blade pitch position restoring said control means to the null position when the selected pitch has been reached, and means actuated by said control means when the actual blade pitch departs from the selected pitch by a predetermined amount moving said valve to block the flow of said hydraulic fluid and limit the pitch increase.

21. In an aircraft having a movable propeller support, a controllable pitch propeller, pitch control mechanism, means operatively connecting said control mechanism and said propeller, means independent of said connecting means limiting the movement of said connecting means by said control mechanism and means also independent of said connecting means positioned by the position of said movable propeller support adjusting the active position of said limiting means.

22. In an aircraft having a movable propeller support, a controllable pitch propeller, control mechanism, means connecting said control mechanism and said propeller providing a substantially fixed predetermined ratio of control movement to pitch movement for each control position, stop means limiting the movement of said connecting means by said control mechanism, and means positioned by the position of said movable propeller support adjusting the active position of said stop means without affecting said ratio.

23. In an aircraft having a compartment and a propeller support and means for moving said support with respect to said compartment to provide vertical and horizontal flight, movable control means, a controllable pitch propeller having means, operatively connected with said control means, adjusting the propeller pitch and providing a substantially fixed ratio of control movement to pitch movement, stop mechanism limiting the movement of said control means, and means, controlled by the relative position of said support and compartment, adjusting said stop mechanism to provide different pitch limits in vertical and horizontal flight positions of said support while maintaining said substantially fixed ratio of control and pitch movement.

24. In an aircraft having a compartment and a wing, means for moving said wing with respect to said compartment to provide vertical and horizontal flight, movable control means, a controllable pitch propeller having means, operatively connecting said control means with said propeller to adjust the propeller pitch, stop mechanism independent of said connecting means limiting the movement of said control means and means also independent of said connecting means, controlled by the relative position of said compartment and wing, adjusting said stop mechanism to provide different pitch limits in vertical and horizontal flight positions of said wing.

25. Control mechanism as claimed in claim 8 in which said connecting means includes means, independent of said control mechanism for changing the relative pitch and control mechanism positions.

26. Control means as claimed in claim 9 including additional control means, independent of said stop means for independently adjusting said adjusting means to change the propeller pitch relative to said first mentioned control means.

27. In an aircraft having a compartment and a propeller support movable with respect to said compartment to provide vertical and horizontal flight, a controllable pitch propeller including a pitch adjusting motor on said support, control means, means operatively connecting said control means and said motor to adjust the propeller pitch, stop mechanism limiting the movement of said control means toward high pitch, means controlled by the relative position of said compartment and propeller support positioning said stop mechanism to provide different pitch limits in vertical and horizontal flight positions of said support, a high pitch stop limiting the movement of said motor to a preselected high pitch value, means controlled by the relative position of said compartment and support disabling said high pitch stop when said support is positioned for horizontal flight, propeller feathering means by passing said stop mechanism, said high pitch stop, when activated, preventing feathering of said propeller.

References Cited in the file of this patent

UNITED STATES PATENTS

| | | |
|---|---|---|
| 2,284,902 | Hosford | June 2, 1942 |
| 2,327,370 | Pullin | Aug. 24, 1943 |
| 2,337,571 | Pullin | Dec. 28, 1943 |
| 2,350,066 | Parker | May 30, 1944 |
| 2,513,660 | Martin et al. | July 4, 1950 |
| 2,612,960 | Muzzy | Oct. 7, 1952 |
| 2,613,072 | Carson et al. | Oct. 7, 1952 |
| 3,011,832 | Euga | Dec. 5, 1961 |